United States Patent Office 3,257,242
Patented June 21, 1966

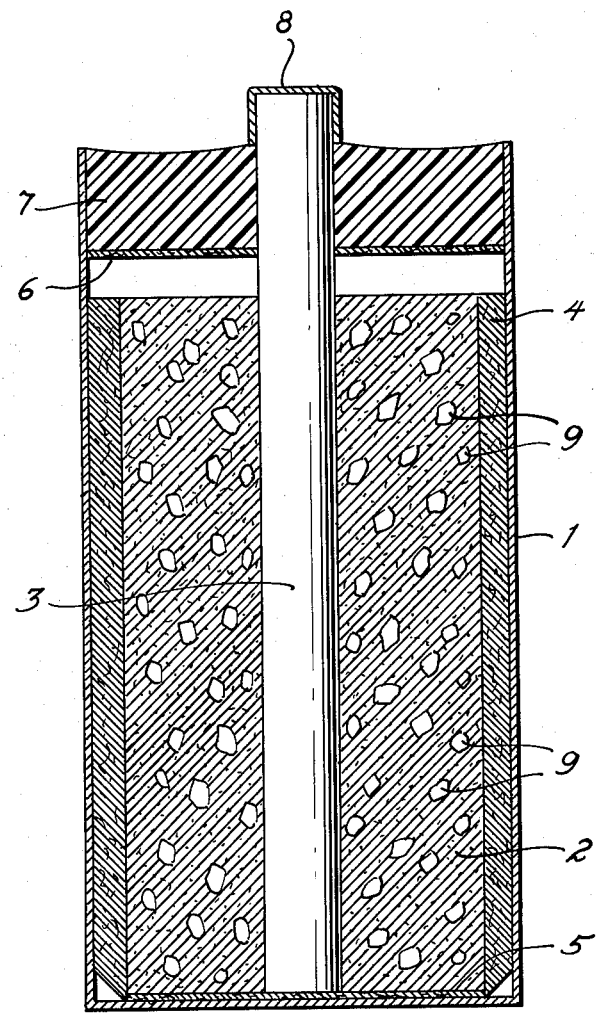
INVENTORS.
JOACHIM EULER
GUENTHER RYHINER
ALFRED SCHMIER
PAUL SCHOLZ

3,257,242
PRIMARY BATTERY CELL WITH A PULVERULENT ORGANIC POLYELECTROLYTE
Joachim Euler, Frankfurt am Main, Guenther Ryhiner, Bad Soden, Taunus, and Alfred Schmier and Paul Scholz, Frankfurt am Main, Germany, assignors to Varta Aktiengesellschaft, Frankfurt am Main, Germany, a corporation of Germany
Filed Jan. 29, 1963, Ser. No. 254,814
Claims priority, application Germany, Feb. 1, 1962, P 28,718
24 Claims. (Cl. 136—100)

The present invention relates to improvements in galvanic primary battery cells with a manganese dioxide depolarizer black mix containing a sal ammoniac solution electrolyte.

In such Leclanche type dry cells, the voltage tends to decrease rapidly during discharge. One of the most important reasons for this is the increase of the pH-value of the electrolyte in the potential-forming pores of the positive electrode during discharge. Attempts have accordingly been made to stabilize the electrolyte pH in the acidic range, for instance, by the addition of organic acids or inorganic buffering substances to the black mix. Thus it has been proposed to add a combination of hydrofluoric acid and fluorides to buffer the pH to a value of about 3.0. Zinc chloride and hydrochloric acid also have been used as buffers to maintain the pH at about 1.5 to 2.0. However, these chemical buffering systems have the considerable disadvantage of greatly increasing the corrosion of the anode metal, which is usually zinc. Furthermore, the introduction of ions which do not take part in the electro-chemical reaction in the cell produces undesirable effects in the stored or operating cell. Finally, the added buffers occupy a considerable volume of the cell, thus reducing the space available for the potential-producing substances.

In an effort to overcome these disadvantages, it has also been proposed to produce a Leclanche-type dry cell with a relatively horizontal discharge curve and satisfactory shelf life by pre-treating the manganese dioxide in the depolarizer mix with an alkaline solution and to impregnate it with an ammoniacal ammonium chloride electrolyte. In such a cell, the pH of the electrolyte has been brought into the range prevailing in a Leclanche cell at the end of the discharge. The most serious disadvantage of such a cell resides in the fact that a considerable portion of the discharge voltage, i.e. about 0.3 volt, is lost. Furthermore, unless the manganese dioxide is very finely pulverized, it is very difficult to impose upon it a pH-value which is foreign to it.

It is the primary object of the present invention to avoid all of the above disadvantages in Leclanche cells and yet to produce a cell whose depolarizer electrolyte has a substantially stable pH.

The above and other objects are accomplished in accordance with this invention by adding to the depolarizer black mix an organic polyelectrolyte acid and/or salts thereof. The organic polyelectrolytes useful in the invention include polyelectrolyte acids, such as alginic acid, pectinic acid, hyaluronic acid, polyacrylic acid, polystyrene sulfonic acid, with ionogenic groups, such as carboxyl groups and sulfonic acid groups.

The polyelectrolyte additive constitutes about 5% to about 50%, preferably 10% to 20%, by weight, of the depolarizer black mix.

The polyelectrolyte additive according to the invention produces a particular type of buffering in a black mix containing manganese dioxide and sal ammoniac. As is known, the depolarization is effected in such cells according to the reaction of the following type:

$$MnO_2 + NH_4^+ + e \rightarrow MnOOH + NH_3$$

The ammonia released in this reaction produces the increase in the pH of the depolarizer electrolyte.

The organic polyelectrolytes combine with the released ammonia and, in may cases, solid polyelectrolytes are converted in the process to highly fluid sols.

Preferred polyelectrolytes are pure alginic acid or alginates, particularly salts of alginic acid with a metal which forms complex ammine compounds with ammonia and/or which is no more noble than the anode metal, for instance, zinc and manganese, i.e. which is at least as low in the electromotive series as the anode metal.

With a pure alginic acid polyelectrolyte, the combination with ammonia begins at a pH of 4.0 and proceeds very favorably. Alginates, such as zinc alginate, also combine well with ammonia and are converted in the process into readily flowing liquids. In this case, the zinc exchanged by ammonium is precipitated in the form of its hydroxide without appreciably influencing the pH-value. However, the pH is stabilized at a somewhat higher level than with pure alginic acid, i.e. about 7.0. As the skilled in the art will readily find, each polyelectrolyte has its own pH-stabilizing value.

In the instance of alginic acid the equivalent weight is 176. Each of its uronic acid rings is capable of combining stoichiometrically with one mole of ammonia. The density of alginic acid is about 1 g./cc. Therefore, 176 g. of alginic acid can combine with the amount of ammonia released in the cell at an output of 26.8 ampere/hour if no other buffering system is used. The required weight or volume of alginic acid is, therefore, 6.6 g. or 6.6 cc. per ampere/hour. In the process, the solid alginic acid is softened to form a liquid sol.

Instead of adding only alginic acid as a polyelectrolyte, an alginate may be admixed thereto or only one or more alginates may be used. Preferred alginates include zinc, manganese, aluminum, magnesium, and the alkaline earth metal alginates. All of these alginates have the property of becoming a syrupy sol at a certain pH-value and, at that point, to precipitate the metal ions M according to the reaction equation of the following type:

$$M\text{-Alginate} + NH_3 + H_2O \rightarrow M(OH) + NH_4\text{-Alginate}$$

When using aluminum alginate, the reaction proceeds according to the following equation:

$$Al\text{-Alginate} + 3NH_3 + 3H_2O \rightarrow Al(OH)_3 + 3NH_4\text{-Alginate}$$

In the preferred polyelectrolytes, the metal component is at least as low in the electromotive series as the metal of the anode of the cell, which is usually zinc. Furthermore, it is advantageous for the metal ions of the alginate to form complex ammine compounds with the anion of the electrolyte. For instance, if zinc alginate is used, the zinc ions will form zinc diammine chloride with the chloride ions of the sal ammoniac electrolyte. In this manner, the capacity of the additive to combine with ammonia is considerably increased because the formation of an ammonium salt of the polyelectrolyte is followed by the formation of the complex ammine compound.

For instance, 208 g. of zinc alginate in the black mix can combine with the ammonia formed during an output of 53.6 ampere/hours (equal to 2 Faraday's equivalents) when zinc diammine chloride is stoichiometrically formed. Thus, the required weight or volume of zinc alginate is 3.9 g. or 3.9 cc. per ampere/hour. However, while the additive amount is lower than with the use of pure alginic acid, as hereinabove indicated, the pH-value will be less favorable in operation of the cell.

It is a particularly advantageous feature of the polyelectrolyte additives that they soften and are often converted into very fluid liquids as they stabilize the pH. This improves the diffusion and thus increases the efficiency of the battery cell. Also additives of pectinic acid, hyaluronic acid, polyacrylic acid, and polystyrene sulfonic acid have the same characteristics.

Water is normally present in the depolarizer bobbin and, if desired, the mix may also contain such depolarization improving additives as catalysts, such as $Ag_2O$, $CeO_2$, $Co(OH)_2$, HgO, and $V_2O_5$.

In a preferred embodiment of this invention a granular mixture of manganese dioxide, carbon component, sal ammoniac, and a pulverulent polyelectrolyte are mixed and a depolarizer bobbin is formed. The portion of polyelectrolyte is such as to prevent an increase of the pH-value in the depolarizer, while the electronical conductivity of the bobbin is maintained. The best results are effected with a depolarizer containing 10 to 20%, by weight, of polyelectrolyte. Even with an additive of 50%, by weight, of polyelectrolyte the electronic conductivity of the bobbin is sufficient. With an additive of 5%, by weight, of polyelectrolyte the buffer effect is still sufficient for many special cells.

Preferably, the cathode or depolarizer bobbin contains manganese dioxide activated by one or more additives, such as $Ag_2O$, $CeO_2$, $Co(OH)_2$, HgO, $V_2O_5$, the activated manganese dioxide constituting from about 10% to about 50%, preferably from 15% to 35%, by weight, of the total amount of manganese dioxide in the bobbin.

*Example 1*

6 g. of pulverulent alginic acid are added to 40 g. of depolarizer black mix consisting of 60 parts by weight of manganese dioxide, 15 parts by weight of conductive material, e.g. carbon black, 10 parts by weight of ammonium chloride. After mixing, the depolarizer bobbin is formed.

*Example 2*

If instead of alginic acid the salts thereof are being used 6.8 g. of aluminum alginate, 7.8 g. of manganese alginate, 6.7 g. of magnesium alginate or 7.3 g. of calcium alginate are added to the depolarizer black mix as described in Example 1. In case the mixture of alginic acid and the salts thereof are used, the equivalent portion required according to the proportion of the mixture may be easily calculated.

*Example 3*

The depolarizer black mix consists of 50 to 55 parts by weight of manganese dioxide, 10 to 5 parts by weight of one or more depolarization improving additives, e.g. $Ag_2O$, $CeO_2$, $Co(OH)_2$, HgO, $V_2O_5$, 10 parts by weight of sal ammoniac and 15 parts by weight of conductive material. 12 g. of pulverulent alginic acid or an equivalent quantity of alginates as stated in Example 2 are added to 40 g. of the above mentioned depolarizer black mix.

*Example 4*

Instead of alginic acid and/or the salts thereof approximately the same quantity of pectinic acid, hyaluronic acid, polyacrylic acid, polystyrene sulfonic acid and/or the salts thereof are added to 40 g. of depolarizer black mix as per Examples 1 and 3. The buffer effects per gram of substance of the above mentioned compounds do not vary considerably due to the chemical constitution of the compounds.

Merely by way of example a preferred structural embodiment is shown in the accompanying drawing wherein the figure is a vertical section of one embodiment of a primary battery cell having a depolarizer bobbin according to the present invention.

In this figure there is shown a conventional dry cell including a zinc cup 1 forming the anode and containing the bobbin 2 of depolarizer black mix forming the cathode of the cell and surrounding carbon rod 3 which is the current collector and conductor of the cathode. A separator 4 is interposed between the anode side wall and the cathode while a bottom washer 5 separates the cathode from the anode bottom. The top collar 6 defines an air space with the cathode and carries the seal 7. A centrally vented brass cap 8 is mounted on the carbon rod to constitute the positive terminal of the cell. All of these components and the general structure are conventional and, for further details of structure and materials, reference may be had to "Primary Batteries" by George Wood Vinal, John Wiley & Sons, Inc., New York, 1950, pp. 44–103.

In the embodiment illustrated in the figure the depolarizer bobbin consists of a depolarizer black mix the components of which are manganese dioxide, depolarisation improving additives, conductive material, sal ammoniac, and to which approximately 15%, by weight, of polyelectrolyte 9 according to the invention have been added. This depolarizer black mix may be used as well in flat dry cells of the Leclanche type.

While the invention has been described and illustrated in connection with certain now preferred embodiments, it will be clearly understood that many modifications and variations may occur to the skilled in the art without departing from the spirit and scope thereof, as defined in the appended claims.

We claim:

1. In a primary battery cell of Leclanché type, an ammonia-sequestering material comprising a pulverulent organic polyelectrolyte selected from the group consisting of alginic, pectinic, hyaluronic, polystyrene sulfonic, and polyacrylic acids, salts thereof, and mixtures of at least two of any of the foregoing.

2. The ammonia-sequestering material of claim 1 having the characteristic of becoming highly fluid upon combining with ammonia.

3. The ammonia-sequestering material of claim 1 wherein the cations of the salts are selected from the group consisting of metals at least as low in the electromotive series as zinc, and the cell has an anode metal at least as high in the electromotive series as the cation metal.

4. The ammonia-sequestering material of claim 1 wherein the cations of the salts are selected from the group consisting of zinc, manganese, aluminum, magnesium, and alkaline earth metals.

5. The ammonia-sequestering material of claim 1 distributed through depolarizer material present in the cell.

6. The ammonia-sequestering material of claim 1 wherein alginic acid is the only polyelectrolyte acid.

7. A primary battery cell depolarizer black mix comprising manganese dioxide, sal ammoniac, and a pulverulent polyelectrolyte having the characteristic of combining with ammonia and selected from the group consisting of alginic, pectinic, hyaluronic, polystyrene sulfonic, and polyacrylic acids and salts thereof and mixtures of at least two of the foregoing.

8. The primary battery cell depolarizer black mix of claim 7, wherein at least a part of the polyelectrolyte is a salt of one of said acids, and the cation of said salt is metallic and is capable of forming complex ammine compounds with ammonia.

9. The primary battery cell depolarizer black mix of claim 7, wherein said acid is pectinic acid.

10. The primary battery cell depolarizer black mix of claim 7, wherein said acid is hyaluronic acid.

11. The primary battery cell depolarizer black mix of claim 7, wherein said acid is polyacrylic acid.

12. The primary battery cell depolarizer black mix of claim 7, wherein said acid is polystyrene sulfonic acid.

13. The primary battery cell depolarizer black mix of claim 7, wherein at least a part of the polyelectrolyte is alginic acid.

14. The primary battery cell depolarizer black mix of claim 7, wherein at least a part of the polyelectrolyte consists of an alginate.

15. The primary battery cell depolarizer black mix of claim 7, wherein at least a part of the polyelectrolyte consists of a mixture of at least one of said acids and one of said salts thereof.

16. The primary battery cell depolarizer black mix of claim 7, wherein at least a part of the polyelectrolyte consists of a mixture of alginic acid and at least one alginate.

17. The primary battery cell depolarizer black mix of claim 7, wherein the polyelectrolyte constitutes about 5% to about 50%, by weight, of the black mix.

18. The primary battery cell depolarizer black mix of claim 17, wherein the polyelectrolyte constitutes 10% to 20%, by weight, of the black mix.

19. The primary battery cell depolarizer black mix of claim 7, wherein 10% to 50%, by weight, of the total amount of manganese dioxide consists of an activated manganese dioxide.

20. A primary battery cell comprising a metallic anode and a cathode including a depolarizer black mix, the black mix comprising manganese dioxide, sal ammoniac, and a pulverulent salt of an organic polyelectrolyte acid, the salt having the characteristic of combining with ammonia and having as its cation a metal which is at least as low in the electromotive series as the anode metal, and the polyelectrolyte acid being selected from the group consisting of alginic, pectinic, hyaluronic, polystyrene sulfonic, and polyacrylic acids.

21. The primary battery cell of claim 20, wherein the metal cation forms complex ammine compounds with ammonia.

22. The primary battery cell of claim 20 wherein the organic polyelectrolyte acid is alginic acid.

23. The primary battery cell of claim 20 wherein the cation metal is selected from the group consisting of zinc, manganese, aluminum, magnesium, and the alkaline earth metals.

24. The primary battery cell of claim 23 wherein the anode metal is zinc and the salt of an organic polyelectrolyte acid is a salt of alginic acid.

References Cited by the Examiner
UNITED STATES PATENTS

| | | | |
|---|---|---|---|
| 2,747,009 | 5/1956 | Kirkwood et al. | 136—157 |
| 3,000,997 | 9/1961 | Trigg | 136—138 |

ALLEN B. CURTIS, *Primary Examiner.*

JOHN H. MACK, WINSTON A. DOUGLAS, *Examiners.*

D. L. WALTON, *Assistant Examiner.*